United States Patent [19]
Camboulives et al.

[11] 3,974,649
[45] Aug. 17, 1976

[54] THERMAL RESPONSIVE NOISE SUPPRESSOR FOR EXHAUST DUCT

[75] Inventors: Andre Alphonse Mederic Leon Camboulives, Savigny-sur-Orge; Theophile Francois le Maout, Cesson; Jacques Serge Rejzner; Roger Alfred Jules Vandenbroucke, both of Antony, all of France

[73] Assignee: Societe Nationale d'Etude et de Construction de Moteurs d'Aviation, Paris, France

[22] Filed: Nov. 26, 1974

[21] Appl. No.: 527,497

[30] Foreign Application Priority Data
Dec. 3, 1973   France .............................. 73.42947

[52] U.S. Cl. ...................... 60/271; 181/33.11 B
[51] Int. Cl.² ...................... F02K 1/00; F01N 7/00
[58] Field of Search .......... 60/271, 261, 264, 39.31, 60/39.32; 181/33 HB; 285/47, 187

[56] References Cited
UNITED STATES PATENTS

| | | | |
|---|---|---|---|
| 2,943,449 | 7/1960 | Kurti | 60/39.32 |
| 2,988,302 | 6/1961 | Smith | 60/271 X |
| 3,007,308 | 11/1961 | Rahaim et al. | 60/39.32 |
| 3,121,995 | 2/1964 | Albani | 60/39.32 |
| 3,188,115 | 6/1965 | Morrish et al. | 285/187 X |
| 3,572,029 | 3/1971 | Swift, Jr. | 60/39.32 |
| 3,722,215 | 3/1973 | Zhdanov et al. | 60/39.32 |
| 3,742,703 | 7/1973 | Melconian | 60/39.32 |
| 3,826,088 | 7/1974 | Nash et al. | 60/261 |
| 3,842,595 | 10/1974 | Smith et al. | 60/39.32 X |

*Primary Examiner*—Carlton R. Croyle
*Assistant Examiner*—Thomas I. Ross

[57] ABSTRACT

An exhaust duct for a thrust jet engine, such as a rocket or gas turbine, in which an acoustic and/or thermal protection lining is situated coaxially within a support element of the duct and is deformable radially relative to the support member, and preferably also adapted for relieving axial differential expansion stresses between the lining and the support element.

7 Claims, 5 Drawing Figures

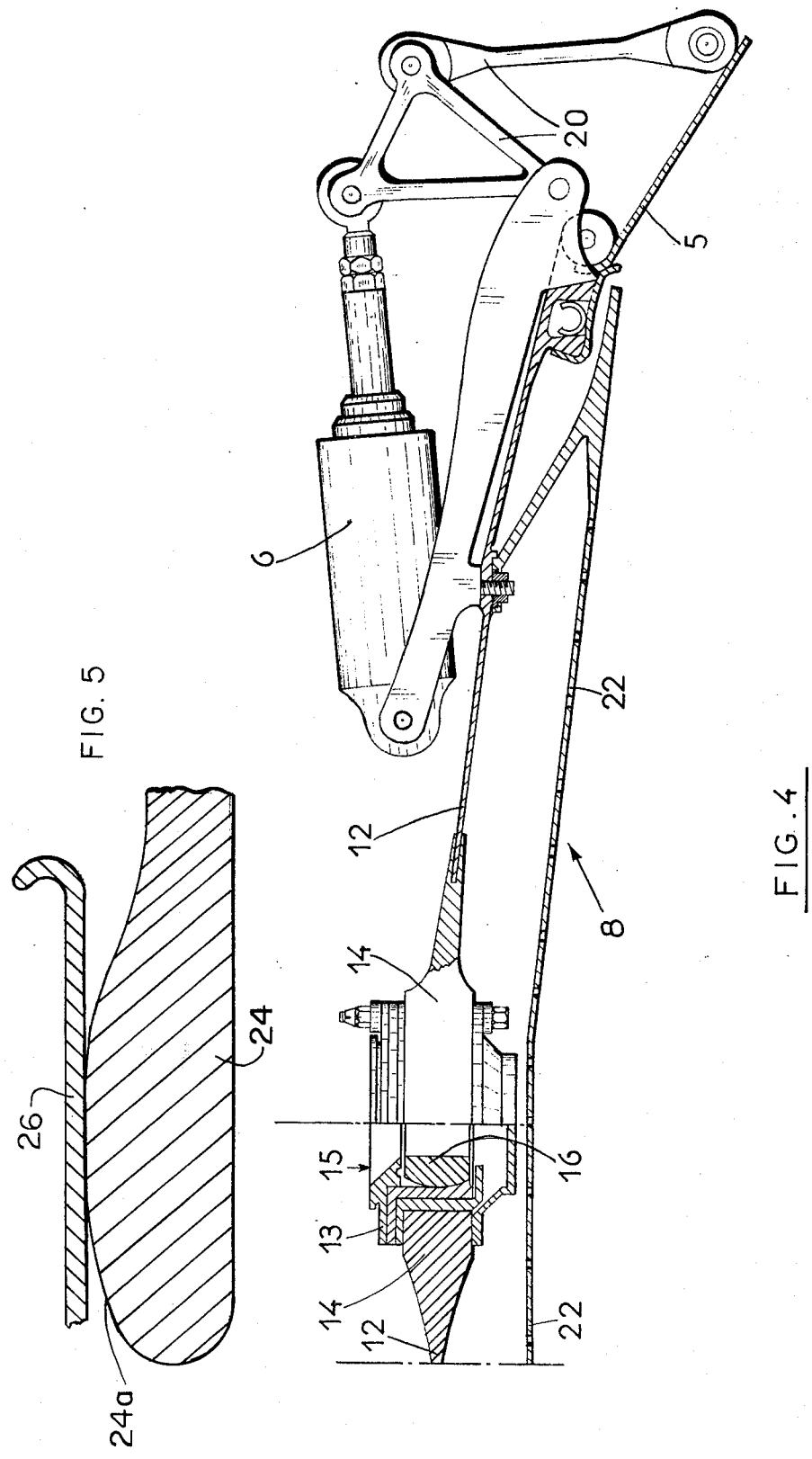

1

THERMAL RESPONSIVE NOISE SUPPRESSOR FOR EXHAUST DUCT

The present invention relates to the acoustic and/or thermal protection of exhaust ducts in thrust jet engines such as a gas turbine engine or a rocket engine.

It is known that in jet engines the wall of the exhaust duct, hereinafter called the support element of the duct, is subjected to major mechanical stresses which are particularly due to pressure and temperature differentials across its surfaces as a result of the high pressure, high temperature exhaust gas stream.

In order to make allowance for these stresses it is known to make the support element of a plurality of pieces hinged to one another but this complicates the production of the jet engine also raising its cost and increasing the risks of its failure.

According to the present invention we provide a thrust-jet engine exhaust duct comprising a tubular support element, with an acoustic and/or thermal protection lining of perforated sheet metal which extends coaxially within the support element of the duct to define together therewith over at least part of the length of the support element an undivided annular cavity, and which is rendered integral with the support element at each of the ends of the lining, and connection means linking the lining in its intermediate region with said support element.

Thus, in the exhaust duct of this invention the presence of the lining creates opposite that surface of the support element which is subjected to the higher temperature a layer of fluid at an intermediate temperature, thereby minimising the stresses in said support element.

Preferably the lining comprises at least three consecutive annular sections of which each axially outer end section is firmly connected to the support element and the or each intermediate section is on the one hand connected to the support element so as to allow radial displacement relative to the support element and on the other hand engaged with each of the adjacent end sections in a manner enabling axial displacement and/or radial deformation of the support section elements so engaged.

In such a duct each terminal lining section may advantageously be formed by a bell-mouthed sleeve or collar which is firmly connected to the support element.

The means connecting each end section of the lining to the adjacent intermediate section may comprise two annular swivel flanges each formed in a respective one of said sections to be connected and enabling axial displacements and/or radial deformations thereof.

Furthermore, the connection between each intermediate section and the support element may include a part-spherical swivel member carried by the said intermediate section and cooperating with a stud carried by a connecting rod which is articulated to the support element, directly at one of its ends and by a swinging link and twin-lugged bracket at its other end for allowing differential expansion of said element.

The lining may advantageously comprise a single intermediate section provided at each of its ends with a flange engaging a complementary flange on the adjacent end section.

The invention also provides a thrust jet engine having such an exhaust duct.

In order that the present invention will be better understood, the following description is given merely by way of example with reference to the accompanying drawing in which:

FIGS. 2 to 4 are partial schematic views in elevation and longitudinal section of only the exhaust duct of the turbo-jet engine of FIG. 1 (FIG. 2 showing the upstream end section, FIG. 3 showing an intermediate section and FIG. 4 the downstream end section).

FIG. 5 is an enlarged sectional view of a portion of FIG. 2.

Figure 1:
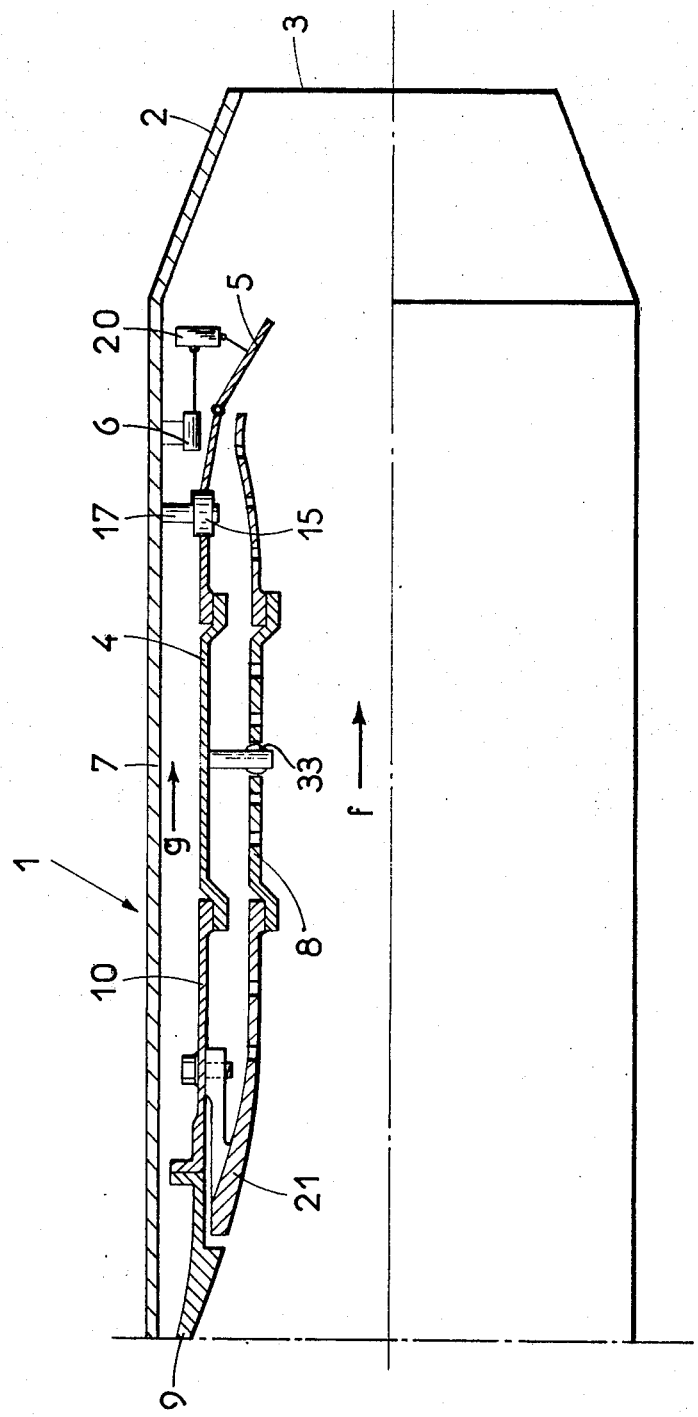
FIG. 1 is a partial schematic view in elevation and longitudinal section of the downstream end of a jet engine exhaust duct.

FIG. 1 shows the exhaust duct 1 of a thrust jet engine, in this case a gas turbine engine, the duct being extended by a convergent secondary nozzle 2 having a gas outlet 3. The exhaust passage comprises a substantially tubular support element 4 extended by flaps or vanes 5 controlled by jacks 6 and disposed interiorly of the external wall 7.

The flow of hot gases along the interior of the support element 4 of the exhaust duct follows the arrow "$f$" and the annular space between said support element 4 and the external wall 7 accommodates a possible secondary flow following the arrow "$g$".

A thermal and/or acoustic protective lining 8, formed of a plurality of successive annular sections of sheet metal extends coaxially along and radially inwardly of the support element 4 over part of the length thereof to define therewith an annular cavity which communicates with the central portion of the duct via the perforations of the lining 8.

Figure 2:
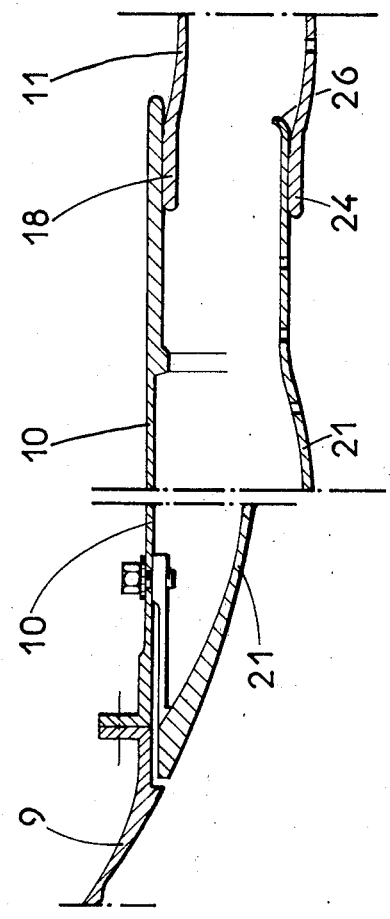
Figure 3:
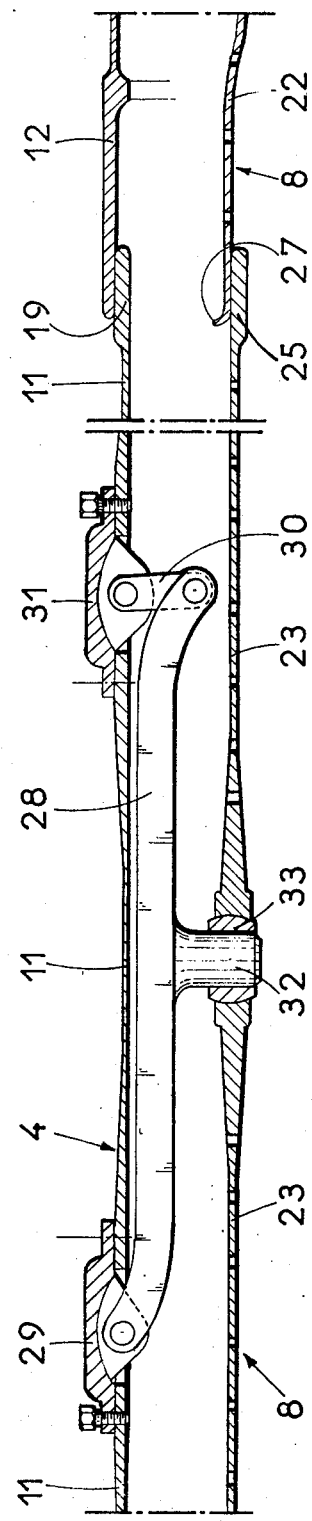

As is shown in FIGS. 2 to 4 the support element 4 is formed by four consecutive annular section 9, 10, 11, and 12. By way of example, a point of attachment of the support element 4 to the outer wall 7 is illustrated in FIGS. 1 and 4 at the level of the extreme downstream section 12 of the support element. To this end the section 12 is formed with an annular boss 14 which is integral with the socket 13 of a swivel joint 15 (FIG. 4) having a part-spherical element 16 connected by a shaft 17 to the external wall 7 of the exhaust duct 1. The upstream and downstream ends of the section 11 of the support element are formed as axially extending flanges 18, 19 on which bear the free ends of the adjacent sections 10 and 12 of the support element 4. The downstream end of the extreme downstream section 12 of the support element supports the flaps 5 whose positioning is controlled by the jacks 6 via an articulated linkage 20. The assembly of sections 9, 10, 11 and 12 thus forms a support element which is deformable, especially under the effect of the stresses to which it is subjected.

The lining 8 is comprised of three successive sleeve sections 21, 23 and 22, of perforated or unperforated sheet metal. The end sleeve sections 21 and 22 are each bell-mouthed at one end 26, 27 and are rigidly fixed to the respective sections 10 and 12 of the support element 4. The intermediate section 23 of this lining 8 has at its upstream and downstream ends respective axially extending swivel flanges 24 and 25 each forming an articulation, together with the bell-mouthed ends 26 and 27 at the free ends of the end sections 21 and 22.

For example, the swivel flange 24 is provided with a curved surface 24$a$ as shown in FIG. 5 to permit articulation between the surface 24$a$ and the cooperating surface of bell-mouthed end 26. The swivel flange 25 is of similar construction.

Centering of the intermediate section 23 is ensured by the upstream flanged articulation 24, 26 and the downstream articulation 25, 27, the angular and axial positioning of the section 23 being constrained by a connecting rod 28 hinged to the support element 4 at one end by an upstream cap or cover 29 (FIG. 3) and at the other end by a connecting link 30 swinging between the lugs of a bracket fastened to a downstream cap or cover 31 (FIG. 3). The link 30 enables differential expansion to be compensated for. The recovery of the differential expansion between the connecting rod 28 and the intermediate section 23 of the lining 8 is ensured by stud 32 connected to the rod 28 and cooperating with a part-spherical swivel means 33 linked to said section 23 as shown in FIG. 3.

By way of example, the perforated metal sheet utilised for making the sections 21, 22, 23 of the lining 8 may have a thickness of about 1.5 mm, and perforations of a diameter of the order of 2 mm with a density of perforation area to total sheet area of from 10 to 20%. When such a metal sheet is employed the optimum acoustic attenuation effect is obtained for a "cavity thickness", i.e. for a radial spacing between lining 8 and support element 4, of the order of 35 mm.

Although FIGS. 1 to 4 show only one set of connection means between the support element 4 and the lining 8, it will be appreciated that a plurality of such connection means will be distributed circumferentially around the duct.

The invention is, of course, by no means limited to the preferred embodiment described and illustrated, and other forms and other embodiments may be employed without thereby departing from the scope of the invention as defined by the following claims.

We claim:

1. A thrust jet engine exhaust duct comprising a tubular support element, at least three annular lining sections disposed successively and coaxially within and radially spaced from said support element, means for connecting the first lining section rigidly to said support element at a first location in said duct, first connector means for connecting the last lining section rigidly to the support element downstream of said first lining section, second connector means for connecting the ends of the at least one remaining lining section to the adjacent ends of the successive lining sections to permit axial displacement and radial deformation of the lining sections so connected, and third connector means connecting said at least one remaining lining section to said support element to permit radial displacement of said at least one remaining lining section with respect to said support element.

2. A jet exhaust duct as claimed in claim 1 wherein said second connector means includes bell-shaped portions formed at the trailing and leading ends respectively of said first and last lining sections for engaging the adjacent ends of the at least one remaining lining section and wherein the leading and trailing ends respectively of said first and last lining sections are rigidly connected to said support element.

3. A jet exhaust duct as claimed in claim 2 wherein said second connector means further includes annular swivel flange means formed at the leading and trailing ends of the at least one remaining lining section for engaging the bell-shaped portions at the adjacent ends of the first and last lining section.

4. A jet exhaust duct as claimed in claim 1 wherein said third connector means includes a part-spherical swivel means disposed intermediate the ends of each of the at least one remaining lining section, a stud engaged with said swivel means, a connecting rod affixed intermediate its ends to said stud, articulation means connecting one end of said connecting rod to said support element, a bracket means affixed to said support element and axially spaced from said articulation means, a connecting link articulated at one end to said bracket and at the other end to said connecting rod whereby differential expansion of said at least one remaining lining section with respect to said support element is compensated for.

5. A jet exhaust duct as claimed in claim 1 wherein there are three successive annular lining sections.

6. A jet exhaust duct as claimed in claim 1 wherein said lining sections have a thickness not greater than 1.5mm and include perforations therethrough, each perforation having a diameter of about 2mm and wherein the total area of said perforations is from about 10% to about 20% of the total area of said lining sections.

7. A jet exhaust duct as claimed in claim 1 wherein said annular lining sections are spaced from said support element a distance of substantially 35 mm.

* * * * *